W. R. MENGEL.
STEREOPTICON.
APPLICATION FILED MAY 31, 1917.
1,342,560.
Patented June 8, 1920.
5 SHEETS—SHEET 1.
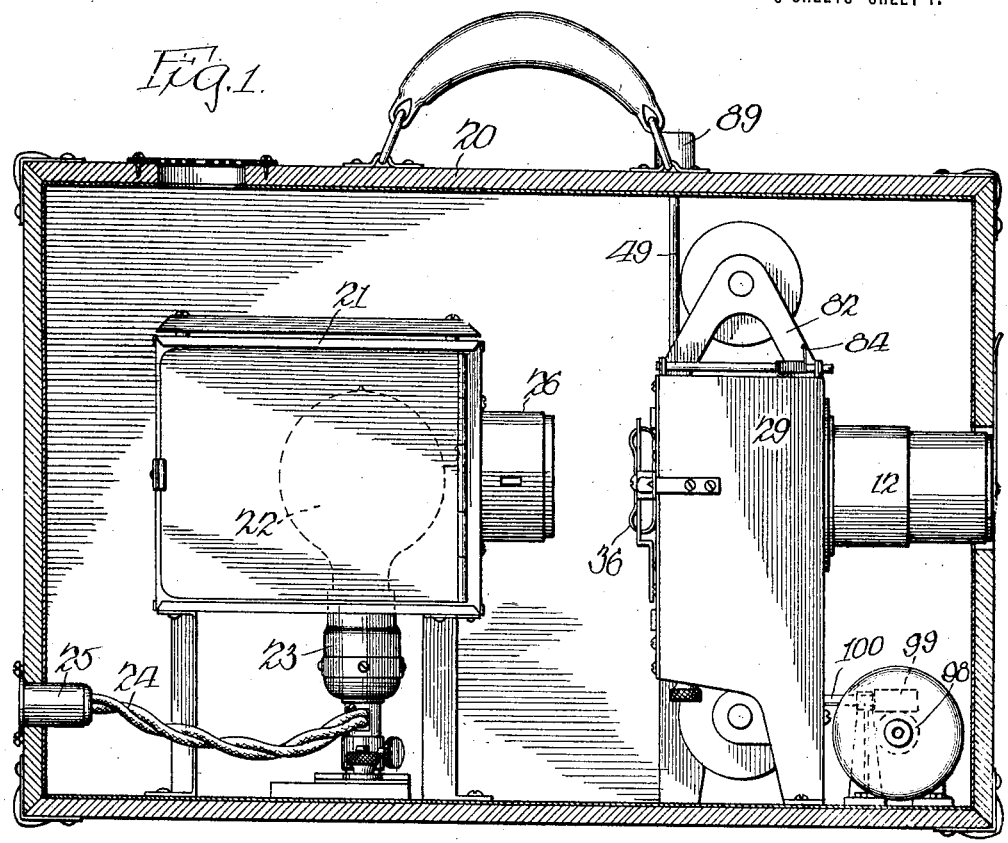
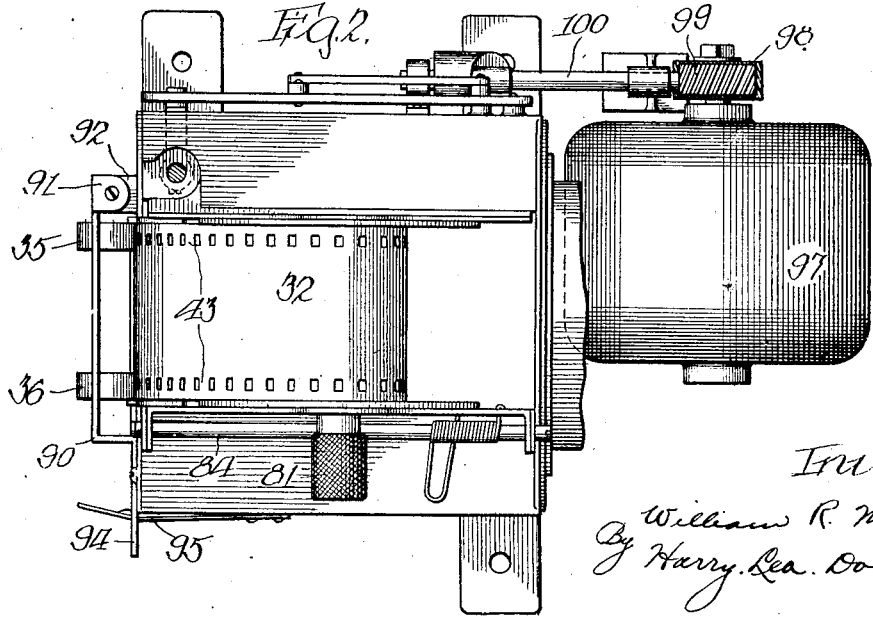
Inventor.
William R. Mengel
By Harry Lea Dodson
Atty.

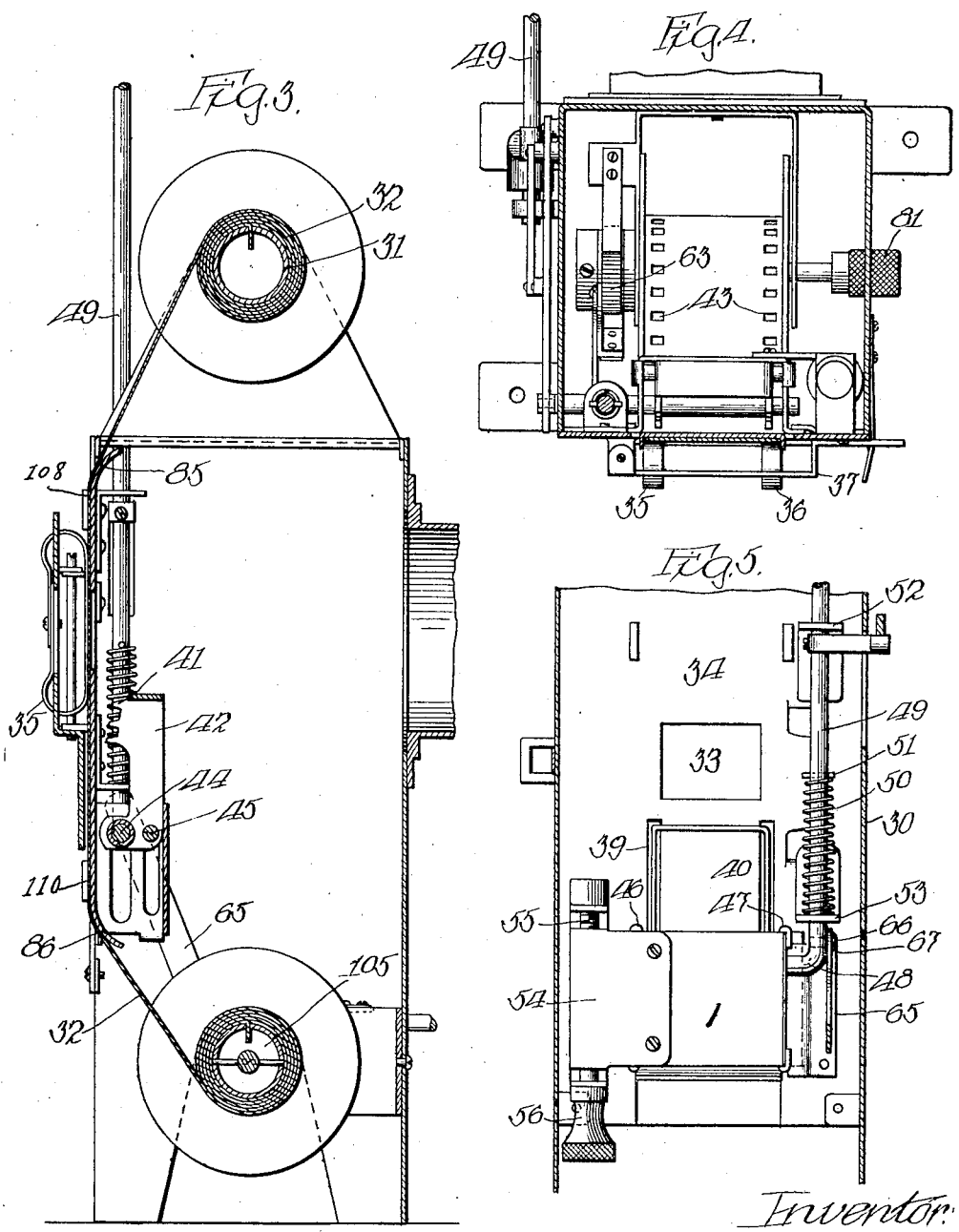

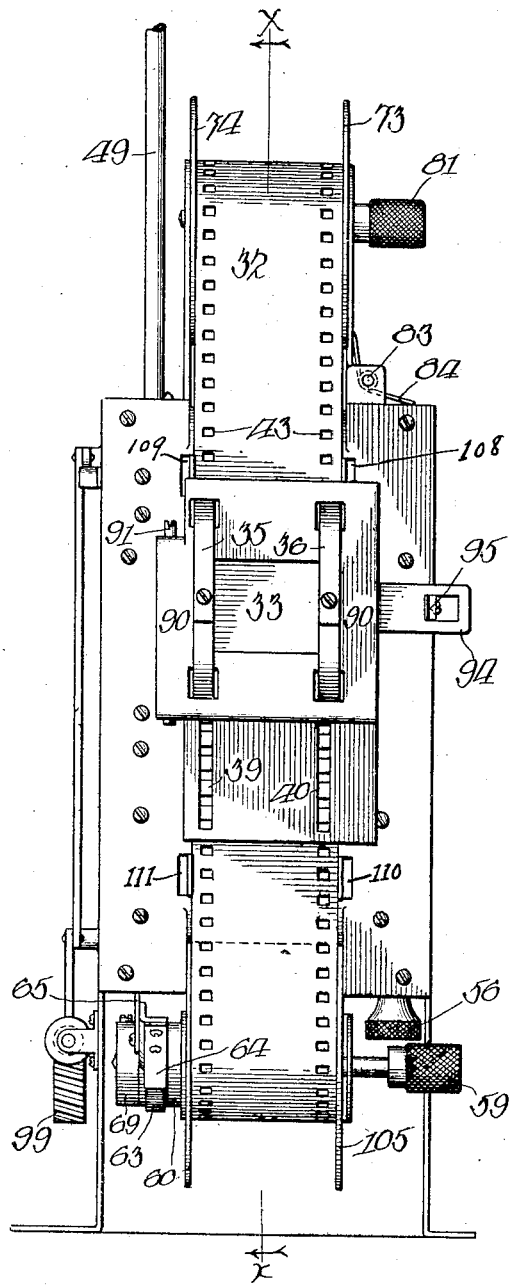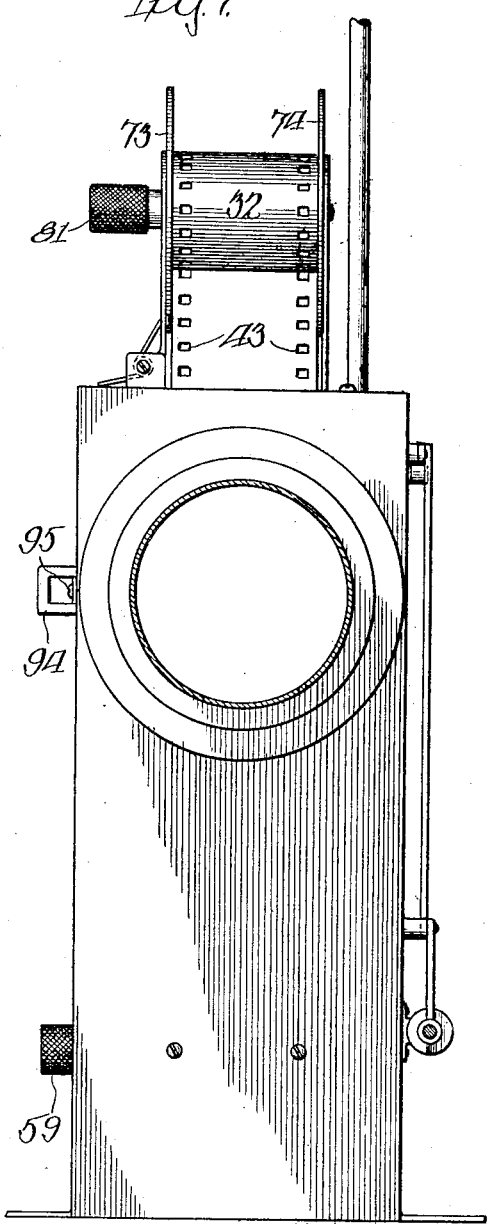

W. R. MENGEL.
STEREOPTICON.
APPLICATION FILED MAY 31, 1917.
1,342,560.
Patented June 8, 1920.
5 SHEETS—SHEET 4.
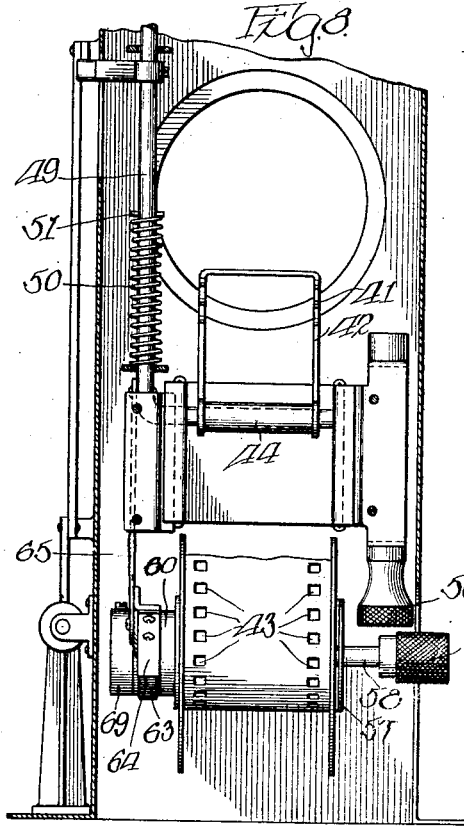
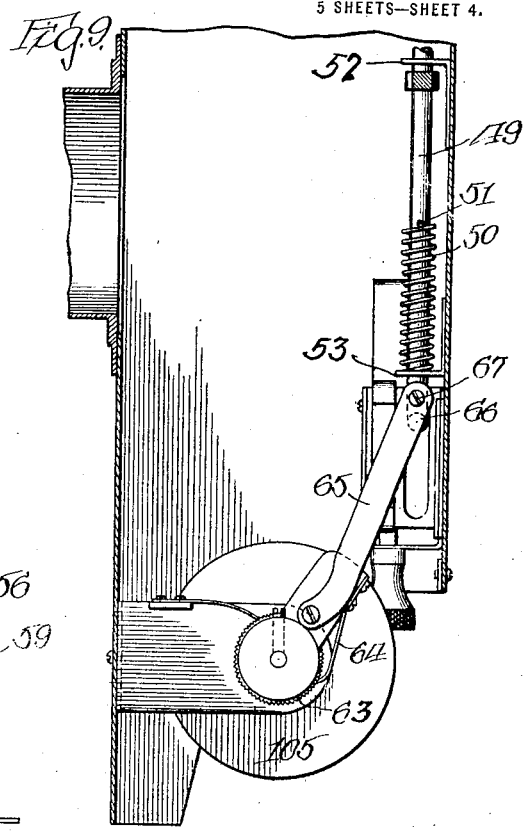
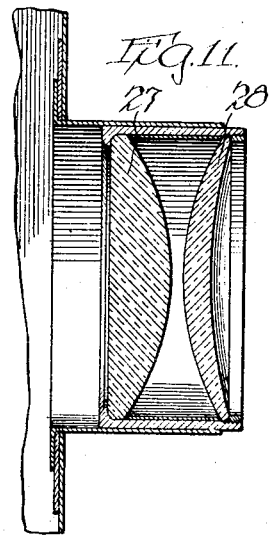
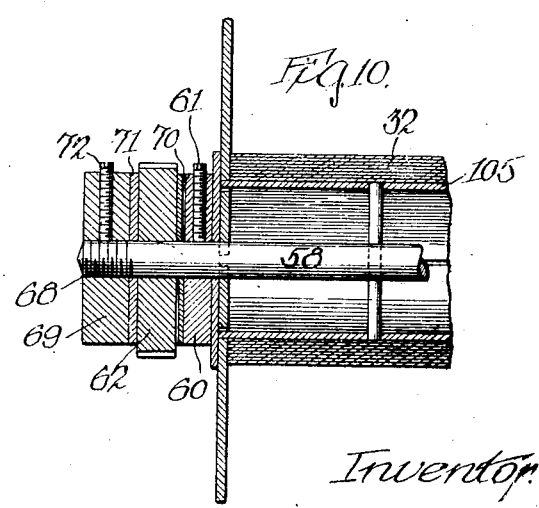

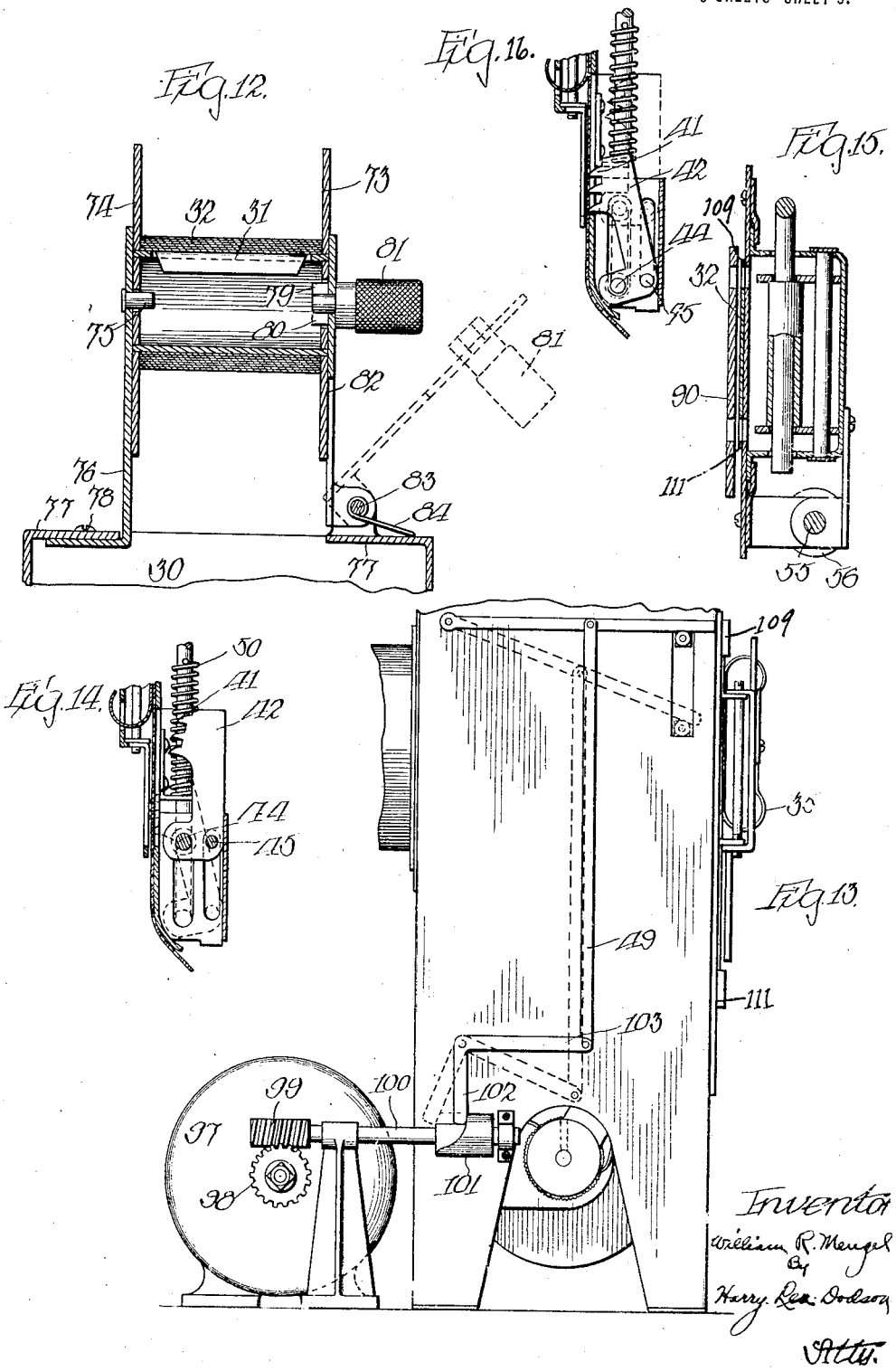

UNITED STATES PATENT OFFICE.

WILLIAM R. MENGEL, OF CHICAGO, ILLINOIS, ASSIGNOR TO AUTOPTICON COMPANY, OF CHICAGO, ILLINOIS.

STEREOPTICON.

1,342,560.          Specification of Letters Patent.        Patented June 8, 1920.

Application filed May 31, 1917. Serial No. 171,874.

*To all whom it may concern:*

Be it known that I, WILLIAM R. MENGEL, a citizen of the United States, residing at Chicago, in the county of Cook and State of Illinois, have invented a certain new and useful Improvement in Stereopticons, of which the following is a specification.

My invention has for its object to construct a stereopticon which will employ a roll of film instead of glass plates, which are objectionable because they are very bulky and heavy to carry, and they are also fragile and consequently are frequently broken, sometimes by accident and sometimes due to the heat, and inasmuch as these slides are often colored, and hence expensive, this loss is to be avoided.

In my improved device, it is possible to use a roll of film in the place of glass slides, and I provide means whereby the film may be moved intermittently and to provide means so that the spools can be manually operated in either direction without interfering with the intermittent mechanism. The spools are provided with mounting devices to facilitate their removal and replacement. I also provide means whereby the intermittent mechanism can be moved from a distance if desired, and also to provide means to operate the winding spool so as to only take up the slack of the film regardless of the amount of film wound on the spool.

My means of accomplishing the foregoing objects may be more readily understood by having reference to the accompanying drawings, which are hereunto annexed and are a part of this specification, in which:

Figure 1 is a front elevation of my device with the inclosing shell or casing in section.

Fig. 2 is a top or plan view of the means to actuate the device from a distance.

Fig. 3 is an enlarged vertical sectional view of the film operating device taken on the line *x—x* in Fig. 6.

Fig. 4 is a horizontal section of the same.

Fig. 5 is a fragmentary transverse sectional elevation in a direction opposite to that of Fig. 6 hereinafter described.

Fig. 6 is an enlarged detail front view of the film operating device.

Fig. 7 is a rear view of the same.

Fig. 8 is an enlarged fragmentary detail view showing the device to operate the winding spool and to remove the film.

Fig. 9 is a side elevation of the same.

Fig. 10 is an enlarged detail view of the mechanism to permit the spool to be wound or unwound without reference to the winding mechanism operated from the exterior of the case.

Fig. 11 is a detail view of my condenser lens.

Fig. 12 is a fragmentary detail view of my improved mechanism for mounting and demounting the upper or supply spool.

Fig. 13 is a side elevation of the device shown in Fig. 2.

Fig. 14 is a detail longitudinal section of the intermittent film feeding mechanism in its upper position.

Fig. 15, is a horizontal section of the same.

Fig. 16, is a companion view to Fig. 14, showing the mechanism in its lower position.

Similar reference numerals refer to similar parts throughout the entire description.

As shown in the drawings, my device is mounted inside of a rectangular casing 20 of the suit case type and having side doors affording access to the contained parts and mechanisms, and comprises a reflector and light containing receptacle 21, which is provided with an electric light bulb 22, mounted upon the usual socket 23, which is connected by means of suitable wires 24, to a plug receptacle 25. This construction permits the operation of the light without opening the casing 20 at all, as all that is necessary to do is to insert a plug in the plug receptacle 25.

The condenser lens 26, is mounted in the forward part of the lamp container 21, and is constructed as clearly seen in Fig. 11, and consists of two lenses 27 and 28, the construction and operation of which will be hereinafter explained.

In advance of the condenser lens 26, is mounted the film operating device 29, which is provided with the standard motion picture projector lens 12, the construction of which will be more clearly seen by reference to the detail views and comprises a rectangular casing 30, at the top of which is mounted a spool 31, which carries the roll of film 32, the film extending down past an opening 33, formed in the aperture plate 34, of the operating device 29. The film is held against this wall by means of two flat springs 35 and 36, carried by a plate 37, which is hinged at one side by pivot lugs 91 and 92. Slots 39 and 40, are cut in the aperture plate 34, just below the opening 33, to provide for the engagement of the teeth 41, of the pawl 42, with the perforations 43, in the film. This pawl is carried by the pin or pivot 44, and has mounted in its lower end a pin 45. I provide two flat springs 46 and 47, which bear against the ends of this pin 45, providing by the tension of the spring for a frictional engagement with the ends of the pin 45. The outer end of the pivot 44, is bent upwardly as at 48, and has an upwardly extending shank 49 which extends up through the top wall of the casing 20 and is provided with an operating button at top for convenient operation by hand. In the construction shown a coiled spring 50 surrounds the shank 49 and has abutment against a cross-pin 51 and a guide bracket 53, so as to yieldingly hold said shank and associated parts in their raised position.

The upwardly extending shank 49, is slidably held in angle plates or guide brackets 52 and 53, the plate 53, forming a bearing for the lower end of the coil spring 50, to press against. The entire pawl 42, is attached to a carriage 54, which is provided with an adjusting screw 55, having a suitable knurled head 56, to provide for the adment of the teeth 41, of the pawl 42, to engage with the perforations 43, in the film. Inasmuch as these perforations are not uniform in all films, it is essential that some means of adjusting the point of engagement of the teeth 41, with the perforations 43, be provided. The film feeding mechanism and its vertical adjusting means above described constitute the subject matter of my application Serial No. 264,502, filed November 29, 1918, as a division of the present application. The lower end of the film 32 is carried by a spool 105, suitably mounted upon bearings 57, being provided with an outwardly extending axle 58, one end of which is provided with a knurled nut 59, for the manual operation of the spool. The other end of the axle is provided with a pair of friction disks 60 and 69 arranged in spaced relation and fixedly attached to the shaft 53 by set screws 61 and 72, the friction disk 69 having adjustable engagement with the screw-threaded end 68 of the shaft 58 with a view to regulate the degree of the frictional engagement of the disks 60 and 69 with the operating ratchet disk now to be described.

62 designates a ratchet disk, revolubly mounted on the shaft 53 between the friction disks 60 and 69, with its ratchet teeth adapted to be engaged by a spring pawl 64, the operating link 65 of which is connected at its upper end 66 by a pivot pin or screw 67 to the lower portion of the operating shank 49 of the film feeding mechanism heretofore described.

70 and 71 designate friction washers arranged at opposite sides of the ratchet disk 62, and formed of any usual material or fabric adapted to afford an even and uniform frictional resistance to independent rotation of the ratchet disk.

The spool 31, is provided with flanges 73 and 74, the central portion of the flange 74, being mounted upon a bearing 75, carried in an upwardly extending member 76, which is attached to the upper part 77, of the rectangular casing 30, in any suitable or convenient manner. As shown, it is attached by screws 78. The other flange 73, of the spool 31, is formed with a slot 79, adapted to receive the wings 80, of the end of the knurled handle 81, provided for rotating the spool.

This handle is rotatably mounted in an upwardly extending bearing member 82, which is hinged by a pin or pivot 83, to the top 77, of the rectangular casing 30, a coil spring 84, being attached to the upwardly extending member 82, at the point 84, as clearly seen in Fig. 1.

This arrangement permits the operator to grasp the knurled handle 81, and by pulling it out, disengage the wings 80, with the slot 79, the bearing member 82, swinging on the hinge 83, to the position shown in dotted lines in Fig. 12, when the spool may be removed from the bearing 75, and a new spool inserted which is then turned until the slots in the center of the flange 73, are in position to register with the wings 80, when the knurled handle 81, will serve to rotate the spool 31, the coil spring 84, serving to hold the member 82, normally in the position shown in Fig. 12.

The operation of the device is as follows: The spool 31, being mounted on the bearing 75, the film 32 is drawn down over the front of the rectangular casing, the ends of the front wall of which are curved as at 85 and 86, to carry the film smoothly from the two spools, and between the guides 108, 109, 110, and 111, which are provided to insure the film registering laterally with the opening 33. The end of the film is then carried down and secured to the spool 105, which is then wound up until the first negative is in register with the opening 33, when the light is turned on and the picture will be projected outwardly upon the screen. When the lecture has been completed regarding the particular view being shown, the operator presses upon the button 89, on the upper end of the rod 49, which causes it to move downwardly compressing the spring 50, and carrying downward the pawl 42. The pressure of the flat springs 46 and 47, upon the ends of the pin 45, retards its movement so as to cause the teeth 42, to move forward passing through the slots 39 and 40, bringing the teeth into engagement with perforations 43, in the film.

Care should be taken at this point to see that the teeth come exactly in register with the perforations, and if necessary, the carriage 54, which carries the pawl 42, can, through the medium of the adjusting screw 55, be moved up or down until an exact registration is effected. This adjustment being once made it will be correct, as long as the same make of film is employed and accurately frames the picture. Upon the continued downward movement of the rod 49, and pin 44, the pawl 42, is carried down carrying with it the film, until the next negative is in register with the opening 33.

It will be remembered that the link 65, is also attached to the rod 49, so that its downward movement serves to carry with it the link 65, which in turn causes the spring pawl 64, to engage the teeth 63, on the rotatably mounted ratchet disk 62. This disk, by means of the frictional washers 70, and 71, causes the rotation of the axle 58, and in turn the spool 105, winding the film on it, and as the size of the spool increases with the amount of film wound upon it, it is obvious that if an exact mechanical connection was provided, it would be inoperative, whereas with the arrangement just described, the spool will only take up the slack of the film when the disk 62, will slip and no damage be done to the film. The ratchet teeth being engaged by the spring pawl 64, prevent the unwinding of the spool. Upon releasing the button 89, the coil spring 50, returns the rod 49, and in turn the link 65, and pawl 42, to their normal position, when the operation can be repeated as many times as desired.

The film is held against the aperture plate of the rectangular casing 30, by means of the flat springs 35 and 36. These are carried by a gate 90, which is mounted upon a hinge pin 91, secured in lugs 92, extending outwardly from the aperture plate of the rectangular casing 30. This gate extends downwardly past the slots in the aperture plate, and is provided with slots, which register with the slots 39 and 40. The gate 90, is also provided with an outwardly extending portion 94, which is adapted to be engaged by a latch 95, secured to the rectangular casing 30. This arrangement permits the gate 90, to be swung open from the wall of the rectangular casing 30, to determine the accurate registration of the teeth 41, of the pawl 42, with the perforations 43, in the films.

The condenser 26 consists of a planoconvex lens 27, and a converging meniscus lens 28, as shown in Fig. 11. I have found by using this form of construction for the lenses, that the light rays from the electric light 22, can remain on the film for an indefinite period of time without burning it. Where it is desired to operate the device from a distance, I provide an electric motor 97, which is provided with a worm gear 98, adapted to mesh with the worm 99, on a shaft 100, the rotation of which through the medium of a cam 101, moves a bell crank lever 102, the outer end 103, of which is connected to the rod 49, thus serving to actuate the operating mechanism. The continued rotation of the shaft 100 carries the cam until it reaches the position shown in Fig. 13, when the bell crank lever is returned to its normal position by means of the coil spring 50, the ratio between the worm and gear being such that all that the operator has to do is to close the circuit by means of a push button (not shown) for a long enough period of time to rotate the cam 101 once which will bring the next negative into register with the opening 33.

Having described my invention what I regard as new and desire to secure by Letters Patent is:

1. In an apparatus of the type described and in which the film supply and film take up spools are mounted in vertically spaced relation on a supporting frame with a film feeding mechanism arranged intermediate of said spools upon a reciprocating carriage, the combination of a carrying shaft for the take up spool, a pair of friction disks secured to said shaft, a ratchet disk mounted loosely on said shaft between the aforesaid friction disks and in frictional engagement therewith, an operating pawl adapted for step by step engagement with the ratchet disk, and a link operatively connecting said pawl to the reciprocating carriage of the film feeding mechanism, substantially as set forth.

2. In an incased optical projection apparatus of the type described, the combination of a supporting frame, a film supply spool and a film take-up spool carried in vertically spaced relation on said frame, the film take-up spool having a carrying shaft, a ratchet disk having frictional operative association with said shaft, an apertured guide plate for a picture film carried by said frame, a reciprocating film feeding mechanism associated with said guide plate, means for effecting reciprocation of said feeding mechanism, the same comprising a vertically sliding shank fixedly connected at its lower end to said feeding mechanism, a spring adapted to move said shank in one direction, a revoluble shaft provided with an operating cam, a motor having driving connection with said shaft, a bell crank lever having one of its arms in operative engagement with said cam and the other of its arms operatively connected to the sliding shank aforesaid, a spring pawl associated with the ratchet disk aforesaid, and a link connecting said pawl with the reciprocating film feeding mechanism, substantially as set forth.

In testimony whereof, I have signed the foregoing specification.

WILLIAM R. MENGEL.